2,793,211
Patented May 21, 1957

2,793,211

PREPARATION OF FORMAMIDES

Joseph C. Lo Cicero, Moorestown, N. J., and Robert T. Johnson, Philadelphia, Pa., assignors to Rohm & Haas Company, Philadelphia, Pa., a corporation of Delaware No Drawing. Application November 9, 1954, Serial No. 467,874

12 Claims. (Cl. 260—294)

This invention relates to a method for the preparation of formamides.

It has formerly been the practice to prepare formamides from an amine and carbon monoxide employing as catalysts metallic sodium in alcohol or, sometimes, sodium methoxide. These preparations are characterized by high pressures, high temperatures, long reaction times, moderate yields, and cumbersome techniques because of the catalyst employed, particularly when sodium is used. Recently, there has been introduced a method for preparing monomethylformamide and dimethylformamide using, as catalysts, cuprous chloride, cupric chloride, ammonium chloride, potassium acetate, and boron fluoride. This recent method has not substantially eliminated the disadvantages common to the prior methods and furthermore adds the disadvantage of severe limitation of reactants possible.

It is the principal object of the present invention to provide a method for the preparation of a great number of formamides that is characterized by substantially mild reaction conditions.

It is a further object of the instant invention to provide a method for the preparation of formamides that is attended by high yields frequently approaching substantially quantitative results.

Other objects and advantages of the subject invention will be apparent hereinafter.

The present invention is concerned with the reaction between an amine and carbon monoxide, in the presence of a catalyst and a solvent, to produce a formamide. The reaction is most advantageously applied to primary alkylamines having an alkyl group of one to eighteen carbon atoms, primarily alkenylamines having an alkenyl group of three to eighteen carbon atoms, primary arylalkylamines having seven to ten carbon atoms, primary alkanolamines having an alkanol group of two to eighteen carbon atoms, secondary dialkylamines having two alkyl groups of one to two carbon atoms each, secondary diarylalkylamines having a total of fourteen to twenty carbon atoms, secondary arylalkylalkanolamines having a total of eight to nine carbon atoms, secondary alkylalkanolamines having a total of three to four carbon atoms, secondary heterocyclicamines having a heterocyclic group of five to six members including the amino nitrogen, primary and secondary alkyldiamines having an alkyl group of two to eighteen carbon atoms, and secondary dialkyldiamines having an alkyl group of one to two carbon atoms on each of the nitrogen atoms individually and having an alkyl group of two to twelve carbon atoms connected to and shared by the nitrogen atoms jointly. Actually, the only critical restriction is that the amine have a primary or secondary amino structure, that is, a non-tertiary amino structure. Many complex primary and secondary amines, such as triamines and other polyamines, as well as other amines not included in the above grouping react according to the present invention but usually they require more severe reaction conditions, take a longer reaction period, and produce lower yields. Best results are obtained with the amines specifically defined above and, therefore, they represent a preferred rather than a critically restrictive listing.

Typical of the preferred amines that may be employed in this reaction are primary alkylamines such as methylamine, ethylamine, butylamine, cyclobutylamine, cyclopentylamine, hexylamine, cyclohexylamine, octylamine, nonylamine, decylamine, undecylamine, dodecylamine, tetradecylamine, and octadecylamine; primary alkenylamines such as allylamine, butenylamine, cyclobutenylamine, pentenylamine, hexenylamine, cycloheptenylamine, octenylamine, decenylamine, undecenylamine, dodecenylamine, tetradecenylamine, and octadecenylamine; primary arylalkylamines such as benzylamine, phenylethylamine, phenylbutylamine, and naphthylethylamine; primary alkanolamines such as ethanolamine, propanolamine, butanolamine, heptanolamine, decanolamine, dodecanolamine, and octadecanolamine; secondary dialkylamines such as dimethylamine, diethylamine, and methylethylamine; secondary diarylalkylamines such as dibenzylamine and di-(butylbenzyl)amine; secondary arylalkylalkanolamines such as benzylaminomethanol, benzylaminoethanol, and naphthylaminoethanol; secondary alkylalkanolamines such as methylaminoethanol and ethylaminoethanol; secondary heterocyclicamines such as pyrrolidine, morpholine, thiamorpholine, and piperidine; primary and secondary alkyldiamines such as ethylenediamine, butylenediamine, hexamethylenediamine, diaminooctane, diaminononane, diaminodecane, diaminododecane, diaminotetradecane, diaminooctadecane, 1,4-diamino-2-methylbutane, and 1,8-diamino-4-methyloctane; and secondary dialkyldiamines such as N,N'-dimethylethylenediamine, N-methyl-N'-ethylbutylenediamine, N,N' - diethylhexamethylenediamine, and N-methyl-N'-ethyldodecylenediamine.

A catalyst is required to effect the present reaction. Suitable for this use are choline, choline methoxide, choline ethoxide, choline propoxide, choline butoxide, higher alkoxides of choline, tetramethylammonium hydroxide and the lower and higher alkoxides thereof. All of these catalysts apparently have substantially the same degree of effectiveness and hence the particular catalyst employed is largely a matter of choice, although choline or the lower alkoxides of choline are usually somewhat preferred. It is preferred to use the catalyst in about a 50% alcoholic solution with a lower alkanol being quite satisfactory. In such an alcoholic solution the catalyst remains active and stable. Usually, when an alkoxide of choline or tetramethylammonium hydroxide is employed, it is used in an alcoholic solution of the corresponding alkanol although such is not necessary. It is satisfactory, for instance, to mix the specific catalysts set forth or to use alcoholic solutions of alkanols not corresponding to the alkoxide employed. Such mixtures apparently have no appreciable effect on the overall catalytic effect. The catalyst has a tendency to become somewhat unstable in appreciably higher concentrations and hence correspondingly less desirable for the present purposes. These catalysts are easily prepared by standard methods, are easy to handle, are not dangerous, and are soluble in the reaction mixture.

It is essential that the present reaction be conducted in the presence of a lower alkanol, such as methanol, ethanol, propanol, or butanol, with methanol somewhat preferred. The alkanol serves as a solvent and in addition probably functions actively in the reaction mechanism. It is believed that initially the alkanol and carbon monoxide react, the result of which facilitates the reaction with the amine to form the final formamide. In the presence of other oxygen containing solvents such as water and dioxane the reaction occurs, if at all, only to an inappreciable extent. The same inappreciable result was also noticed when the reaction was attempted in the absence of the lower alkanols.

Temperatures in the range of about 0 to 75° C. may be advantageously employed. The preferred range is between about 25 to 50° C. At temperatures appreciably above 75° C. there is a tendency for the catalyst to undergo decomposition, and therefore such elevated temperatures are to be avoided. With the temperatures set forth above, yields in excess of 95% and usually approaching substantially quantitative results, are consistently obtained. Usually the lower yields can be traced directly to impurities in the reactants.

Pressures in the range of about 500 to 5000 pounds per square inch may be satisfactorily employed. Actually, much higher pressures may be used but since any advantages from such are inappreciable or negligible, the higher pressures are not recommended. For most purposes the pressures employed are no higher than about 3000 pounds per square inch. Pressures above 3000 pounds per square inch up to about 5000 pounds per square inch are used only in exceptional instances or occasionally to maximize a yield while minimizing a time.

The pressure in the present reaction is maintained by the introduction of carbon monoxide. The carbon monoxide is introduced into a pressure vessel containing the amine, the solvent, and the catalyst until any desired pressure is reached. As the reaction occurs the carbon monoxide is used up and the pressure gradually drops. This pressure drop is a reliable indication of the progress of the reaction. Usually the operating pressure is maintained, and restored after a drop caused by the reaction, at any desired figure within the range previously set forth. The carbon monoxide is usually periodically added until no further drop in pressure is observed. The cessation of a pressure drop is an indication of reaction completion.

The reaction is usually relatively rapid, frequently giving high yields in a matter of minutes. Sometimes, however, the reaction is conducted for about one to five hours in order to assure maximum benefits. The observations of the pressure in the reaction system is helpful in determining the length of the reaction period, as has been described above.

At the conclusion of the reaction the reaction vessel is vented and returned to atmospheric pressures. The products when solid are separated by filtration and then recrystallized, if desired, from a suitable solvent, frequently methanol. The liquid products are isolated by distillation. In the case of either the solids or liquids the products are easily separated from the catalyst and solvent by simple, standard chemical operations.

The formamides formed in the present reaction are useful as solvents, particularly for polymers and are used in petroleum and acetylenic processing operations.

The present reaction is conducted in a manner according to the following illustrative examples, in which parts by weight are used throughout.

*Example 1*

There were introduced into a stainless steel rocking autoclave 73 parts of butylamine, 40 parts of methanol, and 20 parts of a methanolic 50% choline solution. The autoclave was sealed and carbon monoxide was added until the pressure of the system reached 3000 pounds per square inch. The autoclave was rocked and after thirty minutes the pressure had dropped to 2000 p. s. i. The pressure was restored to 3000 p. s. i. by the introduction of more carbon monoxide. The temperature of the system was maintained at 28 to 45° C. during the reaction period. The reaction was continued for two additional hours at the end of which time the reaction mixture was removed from the autoclave. The product was isolated by stripping the reaction mixture at 20 mm. pressure using a still temperature of 70° C. and then collecting the distillate at 67 to 71° C. and 0.5 mm. pressure. The product had a nitrogen content of 13.8% (theoretical 13.8%) and was identified as butylformamide.

Methylformamide and ethylformamide were similarly prepared from methylamine and ethylamine, respectively.

*Example 2*

There were added together in a pressure vessel 66 parts of octadecylamine, 50 parts of methanol, and 14 parts of a methanolic 50% choline solution. Pressure was applied to the system by the introduction of carbon monoxide until 3000 pounds per square inch was reached. The reaction was conducted for two and a quarter hours at 28 to 50° C. As the reaction progressed the pressure gradually dropped. From time to time carbon monoxide was added to maintain the pressure of the system at about 3000 p. s. i. At the conclusion of the reaction period the reaction mixture was removed from the pressure vessel and the product isolated. The product was identified as octadecylformamide.

Similarly, there was prepared cyclohexylformamide from cyclohexylamine employing an ethanolic 40% choline solution as catalyst.

*Example 3*

There were introduced into a reaction pressure vessel 57 parts of allylamine, 40 parts of methanol, and 15 parts of a methanolic 50% choline solution. Carbon monoxide was introduced until the pressure of the system reached 3000 pounds per square inch. The reaction system was held in the temperature range of 27 to 46° C. for a period of two hours during which time the pressure dropped as the reaction proceeded. During the reaction period the pressure of the system was held in the range of 2000 to 3000 p. s. i. At the conclusion of the reaction the product was isolated by distillation at 53 to 55° C. and 0.4 mm. of pressure. The product was identified as allylformamide.

There was similarly prepared from octenylamine, octenylformamide.

*Example 4*

A mixture of 68 parts of octadecenylamine, 50 parts of methanol, and 25 parts of a methanolic 25% choline solution was added to a reaction pressure vessel. Carbon monoxide was added to the system until the pressure reached 2500 pounds per square inch. The reaction was conducted for two hours at 28 to 55° C. during which time the pressure gradually dropped as the reaction advanced. At the termination of the reaction the product was separated and identified as octadecenylformamide.

In like manner, there was prepared cycloheptenylformamide from cycloheptenylamine, using tetramethylammonium methoxide as catalyst.

*Example 5*

There were added to a pressure vessel 107 parts of benzylamine, 50 parts of ethanol, and 40 parts of a methanolic 30% choline. Carbon monoxide was added until the pressure of the system reached 1500 pounds per square inch. The reaction temperature was held at 30 to 48° C. for one and a half hours. The pressure dropped as the reaction proceeded. Restoration of the pressure was achieved by the introduction of additional carbon monoxide. At the end of the reaction period the reaction mixture was removed from the vessel. The product was isolated and identified as benzylformamide.

From phenylbutylamine, there was prepared in a similar manner, phenylbutylformamide.

*Example 6*

Into a pressure vessel there were added 61 parts of ethanolamine, 50 parts of propanol, and 25 parts of a methanolic 35% choline solution. The pressure of the system was increased to 1000 pounds per square inch by the addition of carbon monoxide. The temperature of the system was maintained at 27 to 44° C. for a period of one hour. During the reaction period the pressure dropped as the carbon monoxide reacted. Intermittently the pressure of the system was restored to 1000 p. s. i. by the introduction of more carbon monoxide. At the end of the reaction the reaction mixture was removed from the reaction vessel. The product was isolated and identified as hydroxyethylformamide.

There were prepared, in similar manner, hydroxydecylformamide and hydroxyoctadecylformamide from hydroxydecylamine and hydroxyoctadecylamine, respectively.

*Example 7*

There were added together in a reaction vessel 89 parts of dimethylamine, 40 parts of methanol, and 20 parts of a methanolic 50% choline solution. Carbon monoxide was added until the pressure of the system reached 4000 pounds per square inch. The temperature of the reaction mixture was gradually increased from 28 to 68° C. during the course of the reaction. The pressure of the system dropped as the carbon monoxide entered into the reaction. From time to time small additions of carbon monoxide were made to restore some of the pressure drop. During the course of the reaction the pressure was maintained between 2000 to 4000 p. s. i. The reaction was conducted for one and a quarter hours. At the end of the reaction period the reaction mixture was stripped. The product was collected at 52.5 to 53.5° C. and 19 to 20 mm. of pressure. The product was identified as dimethylformamide.

Similarly, there was prepared diethylformamide from diethylamine.

*Example 8*

There were introduced into a reaction vessel 62 parts of dimethylamine, 35 parts of methanol, and 14 parts of an ethanolic 50% choline solution. Carbon monoxide was added until the pressure of the system reached 500 pounds per square inch. As the reaction progressed carbon monoxide was introduced in order to maintain the pressure at a constant 500 p. s. i. The reaction was carried out at 31 to 38° C. for a period of four hours. The product was isolated ebullioscopically and identified as dimethylformamide.

This example was repeated using tertamethylammonium butoxide as catalyst. The product was identified as dimethylformamide.

*Example 9*

A mixture of 62 parts of dimethylamine, 35 parts of methanol, and 10 parts of a methanolic 50% choline methoxide solution was introduced into a reaction vessel. Carbon monoxide was added until the pressure of the system reached 500 pounds per square inch. As the reaction progressed the pressure was maintained at a constant level by periodic additions of carbon monoxide. The reaction was conducted for one and a quarter hours at 33 to 38° C. At the end of the reaction the product was separated and identified as dimethylformamide.

The above procedure was repeated using a methanolic 50% choline butoxide solution as the catalyst with the formation of the same product.

*Example 10*

There were mixed together 99 parts of dibenzylamine, 60 parts of methanol, and 30 parts of a propanolic 50% choline solution. Carbon monoxide was added until the pressure reached 1200 pounds per square inch. The temperature of the system was maintained in the range of 25 to 40° C. for two hours. Occasionally, as the pressure dropped during the reaction period, additional carbon monoxide was supplied to the system to restore the pressure to the original level. At the conclusion of the reaction the product was isolated and identified as dibenzylformamide.

In a comparable way there was prepared di-(butylbenzyl) formamide from di-(butylbenzyl)amine.

*Example 11*

A mixture of 75 parts of methylaminoethanol, 40 parts of methanol, and 20 parts of a methanolic 50% choline solution was added to a reaction vessel and pressure was applied to the system by the addition of carbon monoxide. The pressure was held at 2000 to 3000 pounds per square inch during the course of the reaction and the temperature was maintained at 32 to 48° C. The reaction was conducted for two and a quarter hours. The product was isolated by distillation and was collected at 114 to 116° C. and 1.0 mm. of pressure. The product was identified as N-methyl-N-hydroxyethylformamide.

In a similar manner, N-benzyl-N-hydroxyethylformamide was prepared from the corresponding amine.

*Example 12*

Into a pressure reaction vessel there were added 85 parts of piperidine, 50 parts of methanol, 10 parts of a methanolic 50% choline solution. Carbon monoxide was added to the reaction vessel until the pressure reached 1500 pounds per square inch. As the reaction proceeded carbon monoxide was added until the pressure reached 4000 p. s. i. The reaction was conducted for two and a half hours at 33 to 40° C. At the end of the reaction period the reaction mixture was stripped. The product was separated by distillation at 41 to 42° C. and 0.4 mm. of pressure. The refractive index of the product was $n_D^{21}$ 1.4830. The product was identified as N-formylpiperidine.

In like manner, there was prepared N-formylmorpholine using morpholine in place of piperidine.

*Example 13*

A mixture of 60 parts of ethylenediamine, 40 parts of methanol, and 20 parts of a methanolic 50% choline solution was added to a reaction vessel and carbon monoxide was introduced until the pressure of the system reached 3000 pounds per square inch. During the reaction period the pressure was maintained in the range of 2000 to 3000 p. s. i. and the temperature was held at 28 to 45° C. The reaction was conducted for two hours. At the end of the reaction two products were isolated. The monoformamide product had a boiling point of 95° C. at 0.6 to 0.7 mm. of pressure. The diformamide product, after recrystallization from heptane, had a melting range of 108.5 to 109° C.

*Example 14*

There were introduced into a reaction vessel 60 parts of hexamethylenediamine, 40 parts of methanol, and 15 parts of a methanolic 50% choline solution. Carbon monoxide was added to the system until the pressure reached 2000 pounds per square inch. During the course of the reaction the pressure was gradually increased to 3000 p. s. i. The temperature of the system was held at 30 to 42° C. for two and a quarter hours. At the conclusion of the reaction the solid product was separated by filtration and recrystallized from methanol. The product had a melting range of 93 to 95.5° C. and had a nitrogen content of 15.9% (16.3% theoretical). The product was identified as N,N'-diformyl-hexamethylenediamine.

In a similar way, there was made N,N'-diformyldiaminooctadecane from diaminooctadecane.

*Example 15*

A mixture of 44 parts of N,N'-dimethylethylenediamine, 50 parts of methanol, and 10 parts of a methanolic 50% choline solution was added to a reaction vessel. Carbon monoxide was added to the system until the pressure reached 4250 pounds per square inch. The reaction was conducted for two hours in the temperature range of 32 to 60° C. At the end of the reaction the monoformamide product was separated by distillation at 67 to 70° C. and 0.8 mm. of pressure. This product had a neutral equivalent of 116 (116 theoretical), a refractive index $n_D^{21}=1.4662$, and a density $d_{20}=0.987$. The diformamide product, which had been separated from the reaction mixture by filtration, was recrystallized from methanol and gave a melting range of 80 to 81° C. and had a nitrogen content of 18.9% (19.4% theoretical). The monoformamide product was identified as N-formyl-N,N'-dimethyldiaminoethane. The diformamide product was identified as ethylene bis (N-methylformamide). The diformamide product, if desired, may be named, N,N'-diformyl-N,N'-dimethyldiaminoethane.

We claim:

1. A method for the preparation of formamides which comprises reacting, in the range of about 0 to 75° C. and about 500 to about 5000 pounds per square inch of pressure, a non-tertiary amine with carbon monoxide in the presence of a lower alkanol and a catalyst having the formula

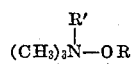

in which R is a member of the class consisting of a hydrogen atom, methyl, ethyl, propyl, and butyl groups and R' is a member of the class consisting of methyl and hydroxyethyl groups.

2. A method for the preparation of formamides which comprises reacting, in the range of about 0 to 75° C. and about 500 to about 5000 pounds per square inch of pressure, a member of the class consisting of primary alkylamines having an alkyl group of one to eighteen carbon atoms, primary alkenylamines having an alkenyl group of three to eighteen carbon atoms, primary arylalkylamines having seven to ten carbon atoms, primary alkanolamines having an alkanol group of two to eighteen carbon atoms, secondary dialkylamines having alkyl groups of one to two carbon atoms, secondary diarylalkylamines having fourteen to twenty carbon atoms, secondary arylalkylalkanolamines having eight to nine carbon atoms, secondary alkylalkanolamines having three to four carbon atoms, secondary heterocyclicamines having a heterocyclic group of five to six members including the amino nitrogen, primary and secondary alkyldiamines having an alkyl group of two to eighteen carbon atoms, and secondary dialkyldiamines having an alkyl group of one to two carbon atoms on each of the nitrogen atoms individually and having an alkyl group of two to twelve carbon atoms connected to the nitrogen atoms jointly, with carbon monoxide in the presence of a lower alkanol and a catalyst having the formula

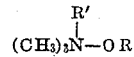

in which R is a member of the class consisting of a hydrogen atom, methyl, ethyl, propyl, and butyl groups and R' is a member of the class consisting of methyl and hydroxyethyl groups.

3. A method for the preparation of formamides which comprises reacting, in the range of about 25 to 50° C. and about 500 to about 3000 pounds per square inch of pressure, a primary monoalkylmonoamine having an alkyl group of one to eighteen carbon atoms with carbon monoxide in the presence of a lower alkanol and a catalyst having the formula

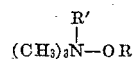

in which R is a member of the class consisting of a hydrogen atom, methyl, ethyl, propyl, and butyl groups and R' is a member of the class consisting of methyl and hydroxyethyl groups.

4. A method for the preparation of formamides which comprises reacting, in the range of about 25 to 50° C. and about 500 to about 3000 pounds per square inch of pressure, a primary alkenylamine having an alkenyl group of three to eighteen carbon atoms with carbon monoxide in the presence of a lower alkanol and a catalyst having the formula

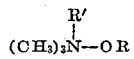

in which R is a member of the class consisting of a hydrogen atom, methyl, ethyl, propyl, and butyl groups and R' is a member of the class consisting of methyl and hydroxyethyl groups.

5. A method for the preparation of formamides which comprises reacting, in the range of about 25 to 50° C. and about 500 to about 3000 pounds per square inch of pressure, a primary arylalkylamine having seven to ten carbon atoms with carbon monoxide in the presence of a lower alkanol and a catalyst having the formula

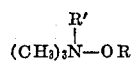

in which R is a member of the class consisting of a hydrogen atom, methyl, ethyl, propyl, and butyl groups and R' is a member of the class consisting of methyl and hydroxyethyl groups.

6. A method for the preparation of formamides which comprises reacting, in the range of about 25 to 50° C. and about 500 to about 3000 pounds per square inch of pressure, a secondary dialkylamine having alkyl groups of one to two carbon atoms with carbon monoxide in the presence of a lower alkanol and a catalyst having the formula

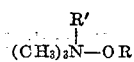

in which R is a member of the class consisting of a hydrogen atom, methyl, ethyl, propyl, and butyl groups and R' is a member of the class consisting of methyl and hydroxyethyl groups.

7. A method for the preparation of formamides which comprises reacting, in the range of about 25 to 50° C. and about 500 to about 3000 pounds per square inch of pressure, a secondary alkyldiamine having an alkyl group of two to eighteen carbon atoms with carbon monoxide in the presence of a lower alkanol and a catalyst having the formula

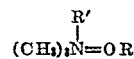

in which R is a member of the class consisting of a hydrogen atom, methyl, ethyl, propyl, and butyl groups and R' is a member of the class consisting of methyl and hydroxyethyl groups.

8. A method for the preparation of methylformamide which comprises reacting, in the range of about 25 to 50° C. and about 500 to about 3000 pounds per square inch of pressure, methylamine with carbon monoxide in the presence of a lower alkanol and a catalyst having the formula

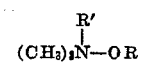

in which R is a member of the class consisting of a hydrogen atom, methyl, ethyl, propyl, and butyl groups and R' is a member of the class consisting of methyl and hydroxyethyl groups.

9. A method for the preparation of allylformamide which comprises reacting, in the range of about 25 to 50° C. and about 500 to about 3000 pounds per square inch of pressure, allylamine with carbon monoxide in the presence of a lower alkanol and a catalyst having the formula

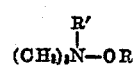

in which R is a member of the class consisting of a hydrogen atom, methyl, ethyl, propyl, and butyl groups and R' is a member of the class consisting of methyl and hydroxyethyl groups.

10. A method for the preparation of benzylformamide which comprises reacting, in the range of about 25 to 50° C. and about 500 to about 3000 pounds per square inch of pressure, benzylamine with carbon monoxide in the presence of a lower alkanol and a catalyst having the formula

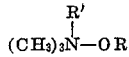

in which R is a member of the class consisting of a hydrogen atom, methyl, ethyl, propyl, and butyl groups and R' is a member of the class consisting of methyl and hydroxyethyl groups.

11. A method for the preparation of N-formylpiperidine which comprises reacting, in the range of about 25 to 50° C. and about 500 to about 3000 pounds per square inch of pressure, piperidine with carbon monoxide in the presence of a lower alkanol and a catalyst having the formula

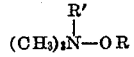

in which R is a member of the class consisting of a hydrogen atom, methyl, ethyl, propyl, and butyl groups and R' is a member of the class consisting of methyl and hydroxyethyl groups.

12. A method for the preparation of dimethylformamide which comprises reacting, in the range of about 25 to 50° C. and about 500 to about 3000 pounds per square inch of pressure, dimethylamine with carbon monoxide in the presence of a lower alkanol and a catalyst having the formula

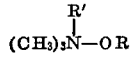

in which R is a member of the class consisting of a hydrogen atom, methyl, ethyl, propyl, and butyl groups and R' is a member of the class consisting of methyl and hydroxyethyl groups.

No references cited.